United States Patent [19]
Kato et al.

[11] Patent Number: 5,306,216
[45] Date of Patent: Apr. 26, 1994

[54] VARIABLE WEIGHT-LOAD GENERATOR

[75] Inventors: Atsuo Kato, Kasugai; Hajime Yamada, Mizuno, both of Japan

[73] Assignee: Dai-ichi Keisoku Inc., Japan

[21] Appl. No.: 872,111

[22] Filed: Apr. 22, 1992

[30] Foreign Application Priority Data

Dec. 27, 1991 [JP] Japan .................................. 3-357974

[51] Int. Cl.⁵ .............................................. A63B 21/00
[52] U.S. Cl. .......................................... 482/1; 482/5; 482/903
[58] Field of Search ............................. 482/1-9, 482/903; 318/580, 560, 590, 593, 671, 685, 686

[56] References Cited

U.S. PATENT DOCUMENTS

| | | |
|---|---|---|
| 4,583,029 | 4/1986 | Robertson, Jr. et al. ........ 318/481 B |
| 4,680,513 | 7/1987 | Kennedy ............................ 318/285 |
| 5,011,142 | 4/1991 | Eckler ................................... 482/5 |
| 5,013,986 | 5/1991 | Gauggel ........................... 318/593 |
| 5,043,649 | 8/1991 | Murakami et al. ............. 318/665 X |
| 5,122,716 | 6/1992 | Kashihara et al. ................. 318/280 |

Primary Examiner—Richard J. Apley
Assistant Examiner—Glenn E. Richman
Attorney, Agent, or Firm—Ronald P. Kananen

[57] ABSTRACT

A weight load generating apparatus for variably outputting a weight load exerted on a load. A load is connected to, for example, an electromagnetic clutch which is driven by a drive source such as a motor to develop a weight load on the load. A physical quantity detector, for example, a torque sensor is connected to the load, and outputs a torque signal indicative of a torque exerted on the load and an angle signal indicative of an angle through which the load is displaced. A signal producing circuit produces a weight signal, a resiliency signal, a viscosity signal, and an inertia signal on the basis of the torque signal and angle signal. A driver circuit controls the magnetic clutch in accordance with the signals produced by the signal producing circuit.

6 Claims, 3 Drawing Sheets

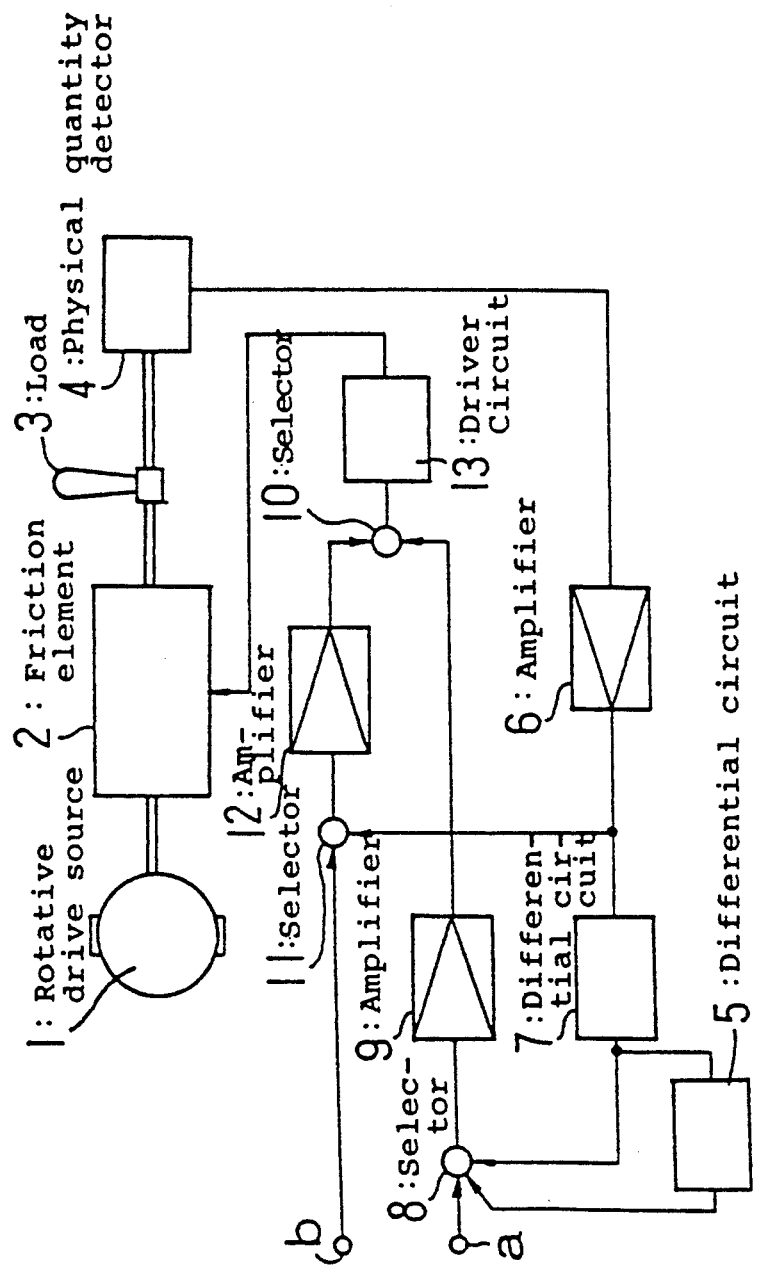
[Fig. 1]

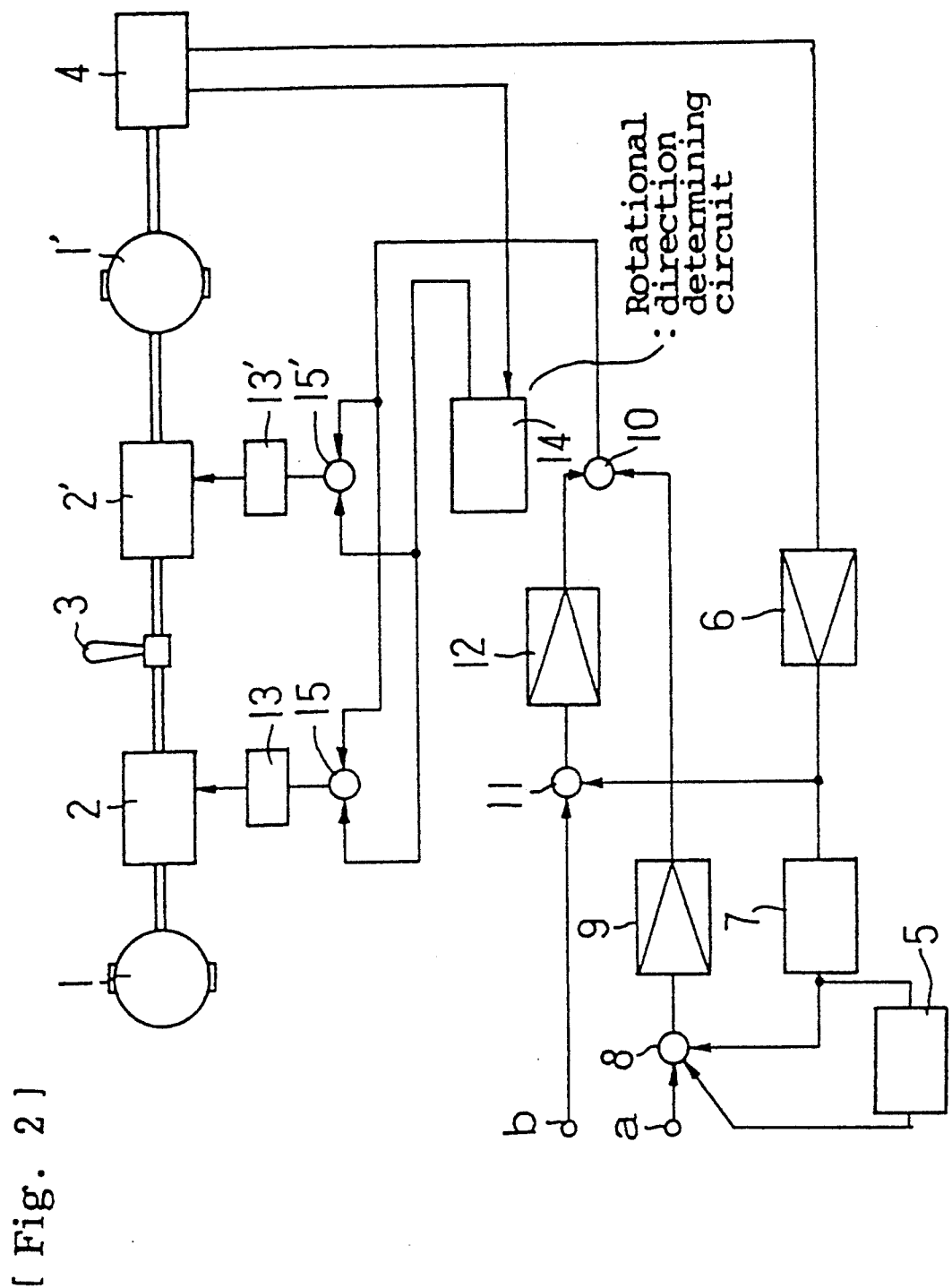
[Fig. 2]

[ Fig. 3 ]
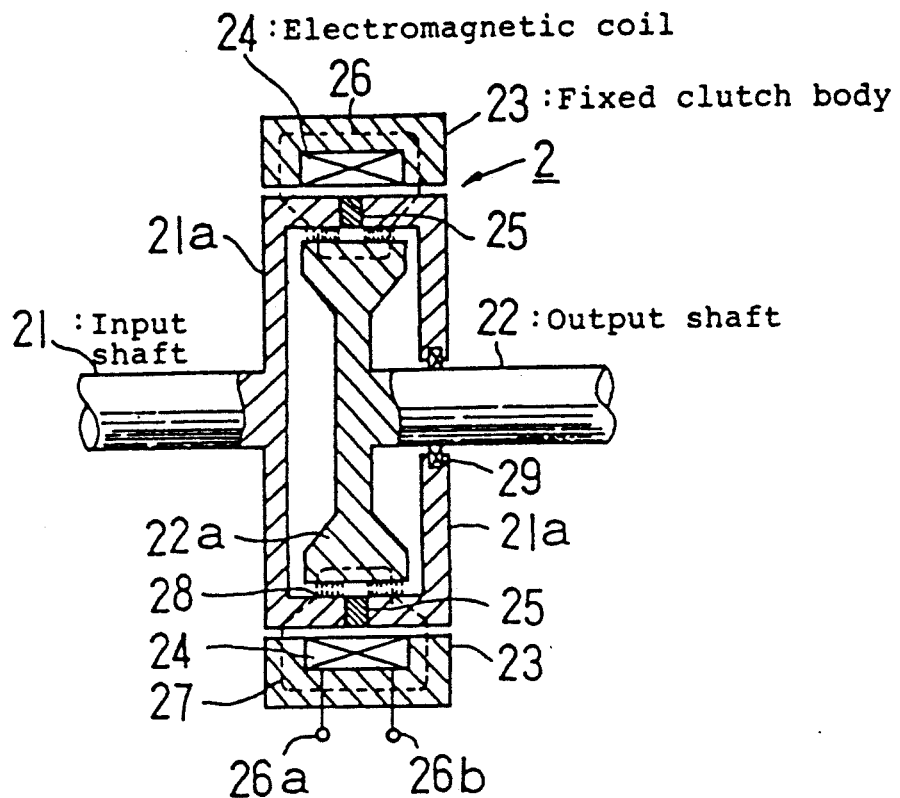
[ Fig. 4 ]
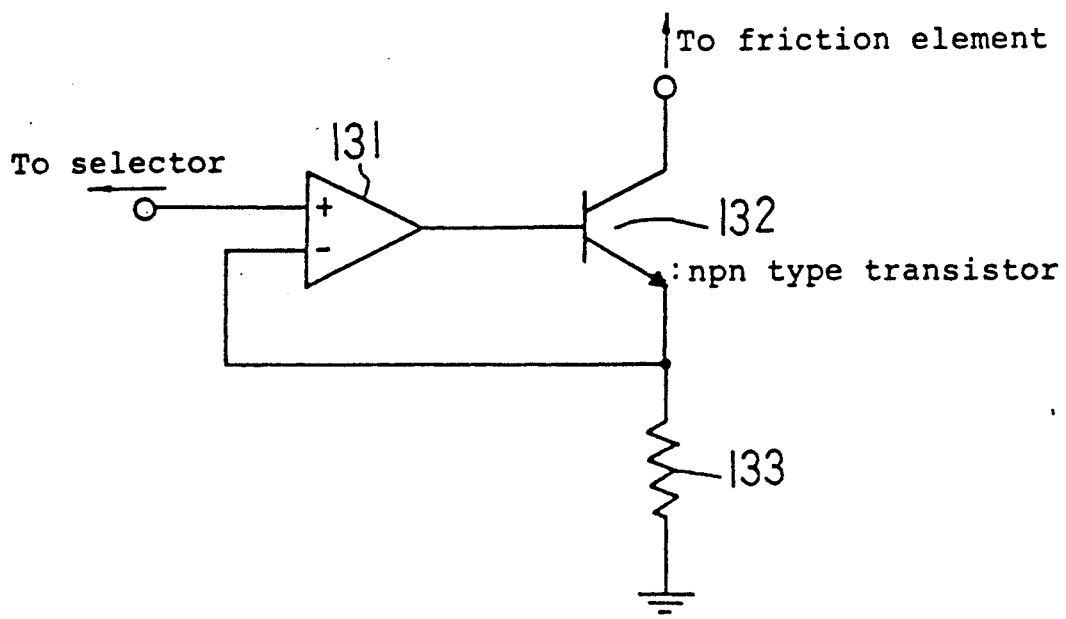

VARIABLE WEIGHT-LOAD GENERATOR

BACKGROUND OF THE INVENTION

1. Field of the Invention

The present invention relates to a variable weight load generating apparatus where the weight exhibited by a viscous friction load and/or a resilient load may be continuously varied at will. The invention may be applied to, for example, the training of sportsmen or patients for improving their muscular power. The invention is also applicable to actuators for robots.

2. Prior Art

There has not been a variable weight load generating apparatus for use in improving the muscular power of sportsmen and patients. Thus, weight loads were implemented by using the weight of discrete objects. A proper weight is selected from different weights to provide a specific weight value. Selecting the proper weight from a variety of discrete weights is rather cumbersome and cannot provide a continuously variable weight. For example, load-applying apparatuses used in robot actuators are designed to hold and/or carry predetermined parts and objects with predetermined pressures or forces. However, the apparatuses are not adapted to continuously vary the holding pressures or weights, or to finely vary them under specific conditions.

The aforementioned prior art apparatuses are of the construction where the torque of a rotative drive source such as a motor, is merely transmitted by way of a friction element or clutch. Accordingly, loads are only transmitted in steps in a discontinuous manner. Thus, the prior art apparatuses find no application in muscular power training for athletes or patients under rehabilitation where stable and variable loads are required. In robotics, a holding or securing force is often required to be varied according to the shape and the nature of the workpieces. The prior art apparatuses are not suitable for this type of applications.

SUMMARY OF THE INVENTION

An object of the invention is to overcome the aforementioned deficiencies and provides a stable and variable weight generator. The variable weight generator has a physical quantity detector (sensor) at the output of a friction element of, for example, a clutch. The detector detects physical quantities (parameters) such as torque and rotational angle and outputs a weight signal, a resilient signal, a viscosity signal, and an inertia signal based on the sensed physical quantities or parameters. The signals are fed back to the friction element so as to enable the control of the respective physical quantities.

A load is connected to a friction element which is driven by a drive source into rotation to develop a weight load on the load. A physical quantity detector or sensor is connected to the load, and outputs a torque signal indicative of a torque exerted on the load and an angle signal indicative of an angle through which the load is moved or displaced. A signal producing circuit produces a weight signal, a resiliency signal, a viscosity signal, and an inertia signal on the basis of the torque signal and angle signal. A driver circuit controls the friction element in accordance with the signals produced by the signal producing circuit.

Another variable weight generator has two drive sources having opposite rotational directions and a rotational direction determining circuit connected with the output of the signal producing circuit, so that the load is selectively applied with either a positive load or a negative load, or combination of both. This arrangement provides a variable weight load with a multitude of performances, which is conveniently applied to a muscular power training apparatus for sportsmen and patients and to actuators of robots.

BRIEF DESCRIPTION OF THE DRAWINGS

Features and other objects of the invention will become more apparent from the detailed description of the preferred embodiments with reference to the accompanying drawings in which:

FIG. 1 shows a circuit of a first embodiment of a variable weight load generator according to the present invention;

FIG. 2 shows a circuit of a second embodiment of a variable weight load generator of the invention;

FIG. 3 shows the construction of a friction element used in the invention; and

FIG. 4 shows a driver circuit used in the present invention.

DETAILED DESCRIPTION OF THE PREFERRED EMBODIMENTS

First embodiment

FIG. 1 shows a first embodiment of a variable weight load generator according to the present invention.

A motor 1 serves a drive source whose output shaft is connected to a friction element 2 to drive the friction element 2 into rotation. The friction element 2 takes the form of an electromagnetic powder clutch as shown in FIG. 3, which is variably energized to control the degree of mechanical connection between the input shaft and output shaft of the powder clutch and to variably control the torque which is transmitted from the motor 1 to a load 3. The load 3 is connected to the output shaft of the powder clutch 2. The load 3 is, for example, a lever of a muscular power training apparatus which the sportsman manually operates when training his body. A physical quantity detector 4 takes the form of, for example, a torque sensor and detects physical quantities such as rotational angle and torque transmitted from the motor 1 to the load. An amplifier 6 is connected with the output of the torque sensor 4 so as to amplify the output signals it produces. A differentiation circuit 7 receives the output of amplifier 6 and outputs a differentiated waveform as a "viscosity" signal. The output of differentiation circuit 7 is directed to a selector 8.

A differentiation circuit 5 receives the viscosity signal from the circuit 7 and outputs an "inertia" signal to the selector 8. The selector 8 receives the viscosity signal and the inertial signal, and then outputs a signal to an amplifier 9 which in turn sends an output thereof to a selector 10. The amplifier 6 outputs a "resiliency" signal and a "weight" signal to a selector 11 which directs the resiliency and weight signals through an amplifier 12 to the selector 10. The selector 10 receives resiliency signal and weight signal over one signal path and the viscosity signal and the inertia signal over the other signal path and supplies a resultant signal to a driver circuit 13. The drive circuit 13 in turn sends an output signal to the powder clutch 2 so as to vary the degree of mechanical connection between the input shaft 21 and the output shaft 22 thereof. The powder clutch 2 controllably and continuously varies the load on the load 3 in accordance with the weight signal inputted thereto, so that the torque which is supplied to the load 3 and the rotational angle through which it is displaced, are controlled. As mentioned above, the load 3 may conveniently be used for automatically performing the training of muscular power of, for example, sportsmen. In the figure, a denotes one of signal input terminals while b denotes the other.

FIG. 3 shows details of the construction of the friction element 2, i.e., an electromagnetic power clutch in the present invention.

The input shaft 21 is connected to the motor 1. the output shaft 22 has one end thereof connected to the load 3. A driving clutch body 21a is of a one piece construction with the input shaft 21 and has a generally U-shaped cross-section. A driven clutch body 22a has a generally T-shaped cross-section and is integrally continuous with the output shaft 22. The driven clutch body 22a is enclosed within the driving clutch body 21a. A fixed or stationary clutch body 23 is disposed about the driving clutch body 21a and houses an electromagnetic coil 24. A magnetic flux interrupting ring 25 is sandwiched between the left and right halves of driving clutch body 21a so as to magnetically isolate the two halves.

The electromagnetic clutch in FIG. 3 operates as follows: An electromagnetic coil 24 is energized by a current through terminals 26a and 26b from a driver circuit 13. Then, a magnetic flux flows through a path as shown by a loop 27 depicted by a dotted line, so that the powder (magnetic material) in the clutch is magnetized to become a magnetic solid body that connects the drive clutch body 21a to the driven clutch body 22a with a degree of mechanical connection which varies in accordance with the level of energization. Thus, torque is transmitted from the input shaft 21 to the output shaft 22. Interrupting the current through the terminals 26a and 26b disconnects the driven clutch body 22a from the driving clutch body 21a so that the torque is no longer transmitted from the motor 1 to the load 3. Reference numeral 29 denotes a sealing material.

The operation of the first embodiment in FIG. 1 will now be described.

If the load 3 is a lever of a muscular power training apparatus for sportsmen or rehabilitation patients, the physical quantities such as the torque applied to the lever and angle through which the lever is rotated are detected by the torque sensor 4. The amplifier 6 amplifies the output signals from the torque sensor 4 and outputs the amplified signals to both the selector 11 and the differentiation circuit 7. The differentiation circuit 7 outputs the viscosity signal to the selector 8. The output of circuit 7 is also directed to the differentiation circuit 5 when in turn outputs the inertia signal to the selector 8. The output of selector 8 is then supplied through the amplifier 12 to the selector 10 where the viscosity signal, inertia signal, resiliency signal, and weight signal are combined. The combined signal is supplied to the driver circuit 13.

As shown in FIG. 4, the driver circuit 13 has an OP amplifier 131 whose output is connected with the base of an npn type transistor 132. The transistor 132 has an emitter connected to the ground through a resistor 133 and a collector connected with the powder clutch 2. The OP amplifier 131 has one input connected with the selector 10 and the other input connected with the junction between the resistor 133 and the emitter of transistor 132. The OP amplifier 131 is driven by the aforementioned resultant current from the selector 10 to cause the transistor 132 to conduct, so that the electromagnetic coil 24 of powder clutch 2 is energized. Thus, the torque is transmitted from the motor 1 to the output shaft 22 of powder clutch 2 in accordance with the physical quantities from the load 3. The load 3 is applied with a continuously varied weight, so that an operator uses the load 3 as a manually operable lever, for example, to train for more muscular power.

Second embodiment

FIG. 2 shows a circuit of a second embodiment of a variable weight load generator according to the invention. Elements similar to those in the first embodiment have been given the same reference numerals and the description thereof has been omitted. A rotational direction determining circuit 14 is connected with the output of the torque sensor 4. The motors 1 and 1' operate in opposite directions and therefore the torques transmitted through the powder clutches 2 and 2' act in opposite directions. The output shafts of motors 1 and 1', the output shafts and input shafts of electromagnetic clutches are all in line with each other. The output of the rotational direction determining circuit 14 is inputted to selectors 15 and 15' which drive the driver circuit 13 and 13', thus controlling the forward and reverse rotations of the shafts connected to the lever. The differentiation circuit 5 outputs the inertia signal to the selector 8. The load 3 is applied with the differences in physical quantities between the powder clutches 2 and 2', i.e., positive and negative quantities or quantities in the forward rotational direction and in the reverse rotational direction. Thus, the torque sensor 4 detects the differences in physical quantities such as torques and angles, which are fed back as in the first embodiment so that the load 3 is applied with continuously variable weight loads. When applied to actuators of robots and to muscular power training apparatuses, opposing torques such as holding forces applied in opposite directions of lever motion, may be continuously varied in magnitude.

Industrial Applicability

As mentioned above, in the present invention, the physical quantity detector or torque sensor detects the torques and angles in accordance with the motion of load 3. The outputs of the torque sensor are used to form the viscosity signal, inertia signal, resiliency signal, and weight signal. The resultant signal which is derived from these signals is fed back via the driver circuit to the powder clutch, so that continuously variable torques are transmitted as a weight load to the load 3. Thus, the invention is conveniently applied to the load 3 such as a manually operable lever of a muscular power training apparatus for sportsmen.

Applying the present invention to actuators of robots allows positive and negative torques to be impressed, thereby continuously varying the weight load and enabling fine control of actuators.

Thus, apparatuses according to the invention have much better performances as opposed to existing apparatuses.

What is claimed is:
1. An apparatus comprising:
    load applying means;
    a first drive source
    a second drive source;
    first clutch means for selectively providing a drive connection between said first drive source and said load applying means in a manner which enables said load applying means to apply a positive load;

a second clutch means for selectively providing a drive connection between said first drive source and said load applying means in a manner which allows said load applying means to apply a negative load;

sensor means for outputting:
- a first signal indicative of a torque exerted by said load applying means, and
- a second signal indicative of displacement induced by said load applying means;

first driver circuit operatively associated with said first clutch means for controlling the amount of drive connection which is established between said first drive source and said load applying means;

second driver circuit operatively associated with said second clutch means for controlling the amount of drive connection which is established between said second drive source and said load applying means; and control circuit means responsive to said first and second signals and operatively connected with said first and second driver circuits for selectively engaging said first and second clutch means so that load is selectively applied in positive and negative modes by said load applying means.

2. An apparatus as set forth in claim 1, wherein said load applying means includes a pivotal lever through which load is applied, said lever being pivotal in a first rotational direction to apply the positive load and pivotal in a second direction to apply the negative load.

3. An apparatus as set forth in claim 1, wherein said first and second drive sources comprise first and second electric motors respectively.

4. An apparatus as set forth in claim 1, wherein said first and second clutch means comprise first and second electromagnetic power clutches.

5. An apparatus as set forth in claim 2, wherein said apparatus is an exercise machine and wherein said lever forms part of a manually operable device.

6. An apparatus as set forth in claim 2, wherein said apparatus forms part of a robot wherein said lever forms part of a device which is adapted to one of grasp and support objects.

* * * * *